(12) United States Patent
Asari et al.

(10) Patent No.: US 10,400,680 B2
(45) Date of Patent: Sep. 3, 2019

(54) SYSTEM AND METHOD FOR SYNCHRONIZING THE OPERATION OF AIRFOIL ACTUATORS OF A GAS TURBINE ENGINE

(71) Applicant: General Electric Company, Schenectady, NY (US)

(72) Inventors: Koji Asari, Sharonville, OH (US); James William Simunek, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 15/278,440

(22) Filed: Sep. 28, 2016

(65) Prior Publication Data

US 2018/0135527 A1    May 17, 2018

(51) Int. Cl.
| | |
|---|---|
| *F02C 9/20* | (2006.01) |
| *F02C 9/22* | (2006.01) |
| *F01D 17/16* | (2006.01) |
| *F02C 7/057* | (2006.01) |

(52) U.S. Cl.
CPC .............. *F02C 9/22* (2013.01); *F01D 17/162* (2013.01); *F02C 7/057* (2013.01); *F02C 9/20* (2013.01); *F05D 2240/12* (2013.01); *F05D 2250/90* (2013.01); *F05D 2270/304* (2013.01); *F05D 2270/708* (2013.01)

(58) Field of Classification Search
CPC .... F02C 9/20; F02C 9/22; F02C 7/057; F01D 17/16; F01D 17/162; F01D 9/041; F04D 27/007; F04D 27/002
See application file for complete search history.

(56) References Cited

U.S. PATENT DOCUMENTS

| | | | |
|---|---|---|---|
| 6,178,867 B1 * | 1/2001 | Kovac | F15B 11/22 91/171 |
| 6,349,900 B1 | 2/2002 | Uttley et al. | |
| 8,682,454 B2 | 3/2014 | Fuller et al. | |
| 8,770,912 B2 * | 7/2014 | Minto | F01D 9/041 415/1 |
| 8,794,920 B2 | 8/2014 | Bacic et al. | |
| 8,849,542 B2 | 9/2014 | Meisner et al. | |

(Continued)

FOREIGN PATENT DOCUMENTS

WO    WO-2014189574 A2 *  11/2014  ........... F01D 17/162

*Primary Examiner* — Igor Kershteyn
*Assistant Examiner* — Topaz L. Elliott
(74) *Attorney, Agent, or Firm* — Dority & Manning, P.A.

(57) ABSTRACT

A method for controlling the operation of a gas turbine includes monitoring an operating parameter of the gas turbine engine. The method also includes determining a first position demand for controlling an operation of a first actuator based on the monitored operating parameter. In addition, the method includes controlling the operation of the first actuator based on the first position demand to adjust the angular position of at least one airfoil included within a first array of airfoils. The method further includes determining a second position demand for controlling the operation of a second actuator based on the first position demand. In addition, the method also includes controlling the operation of the second actuator based on the second position demand to adjust the angular position of at least one airfoil included within a second array of airfoils.

19 Claims, 6 Drawing Sheets

(56) References Cited

U.S. PATENT DOCUMENTS

| | | |
|---|---|---|
| 8,909,454 B2 | 12/2014 | Minto |
| 9,342,060 B2 | 5/2016 | Fuller et al. |
| 10,060,285 B2 * | 8/2018 | Do ................... F01D 17/162 |
| 2012/0269613 A1 | 10/2012 | Mills et al. |
| 2014/0169948 A1 * | 6/2014 | Kay ................... F01D 17/162 |
| | | 415/148 |
| 2015/0378364 A1 | 12/2015 | Karpman et al. |
| 2016/0369745 A1 | 12/2016 | Mueller et al. |
| 2017/0107914 A1 | 4/2017 | Lu et al. |
| 2018/0023485 A1 * | 1/2018 | Kay ................... F01D 17/162 |
| | | 415/148 |

\* cited by examiner

SYSTEM AND METHOD FOR SYNCHRONIZING THE OPERATION OF AIRFOIL ACTUATORS OF A GAS TURBINE ENGINE

FIELD OF THE INFORMATION

The present subject matter relates generally to a system and method for controlling the operation of a gas turbine engine and, more particularly, to a system and method for synchronizing the operation of first and second actuators configured to adjust the angular position of one or more airfoils of the gas turbine engine.

BACKGROUND OF THE INVENTION

A gas turbine engine generally includes, in serial flow communication, a gas generator compressor, a combustor, a gas generator turbine, and a power turbine. The combustor generates combustion gases that are channeled in succession to the gas generator turbine where they are expanded to drive the gas generator turbine. Then, the combustion gases are channeled to the power turbine where they are further expanded to drive the power turbine. The gas generator turbine is coupled to the gas generator compressor via a gas generator shaft, and the power turbine is coupled to an output shaft via a power turbine shaft. The output shaft may be coupled to a load, such as main rotor blades of a helicopter.

The gas generator compressor typically includes one or more arrays of circumferentially spaced airfoils. In certain engines, the one or more arrays of airfoils are actuated through the operation of a controllable airfoil or vane actuator. More specifically, in some engines, a first array of airfoils is actuated through the operation of a first actuator, and a second array of airfoils is actuated through the operation of a separate, second actuator. During operation, the first and second actuators adjust the angular position of the first and second array of airfoils, respectively, based on a monitored operating parameter (e.g., core speed) of the gas turbine engine. However, since the first and second actuators operate independently of one another, the position control loops for controlling the operation of the two actuators are not synchronized, which leads to unintended mismatches between the first and second arrays of airfoils.

Accordingly, a system and method for synchronizing the operation of actuators used to adjust the angular position of airfoils (e.g., vanes) of a gas turbine engine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the operation of a gas turbine engine. The method may include monitoring, with a controller of the gas turbine engine, an operating parameter of the gas turbine engine. The method may also include determining, with the controller, a first position demand for controlling an operation of a first actuator of the gas turbine engine based, at least in part, on the monitored operating parameter. In addition, the method may include controlling, with the controller, the operation of the first actuator based, at least in part, on the first position demand to adjust the angular position of at least one airfoil included within a first array of airfoils of the gas turbine engine. The method may also include determining, with the controller, a second position demand for controlling an operation of a second actuator of the gas turbine engine based, at least in part, on the first position demand. In addition, the method may include adjusting, with the controller, the second position demand based, at least in part, on a bias value associated with controlling the operation of the second actuator. The method may also include controlling, with the controller, the operation of the second actuator based, at least in part, on the adjusted second position demand to adjust the angular position of at least one airfoil included within a second array of airfoils of the gas turbine engine.

In another aspect, the present subject matter is directed to a method for controlling the operation of a gas turbine engine. The method may include monitoring, with a controller of the gas turbine engine, an operating parameter of the gas turbine engine. The method may also include determining, with the controller, a first position demand for controlling an operation of a first actuator of the gas turbine engine based, at least in part, on the monitored operating parameter. In addition, the method may include controlling, with the controller, the operation of the first actuator based, at least in part, on the first position demand to adjust the angular position of at least one airfoil included within a first array of airfoils. The method may also include determining, with the controller, a second position demand for controlling an operation of a second actuator of the gas turbine engine based, at least in part, on the first position demand associated with controlling the operation of the first actuator. In addition, the method may include controlling, with the controller, the operation of the second actuator based, at least in part, on the second position demand to adjust the angular position of at least one airfoil included within a second array of airfoils of the gas turbine engine.

In yet another aspect, the present subject matter is directed to a system for controlling the operation of a gas turbine engine. The system may include at least one airfoil included within a first array of airfoils of the gas turbine engine. The system may also include at least one airfoil included within a second array of airfoils of the gas turbine engine. In addition, the system may include a first actuator and a second actuator. The first actuator may be configured to adjust an angular position of at least one airfoil of the first array of airfoils. The second actuator may be configured to adjust an angular position of at least one airfoil of the second array of airfoils. In addition, the system may include a controller configured to control the operation of the first and second actuators. The controller may include a processor and associated memory. The memory may store instructions that, when implemented by the processor, may configure the controller to monitor an operating parameter of the gas turbine engine. The controller may also determine a first position demand for controlling the operation of the first actuator based, at least in part, on the monitored operating parameter. In addition, the controller may control the operation of the first actuator based, at least in part, on the first position demand to adjust the angular position of the at least one airfoil included within the first array of airfoils. The controller may also determine a second position demand for controlling the operation of the second actuator based, at least in part, on the first position demand. In addition, the controller may adjust the second position demand based, at least in part, on a bias value associated with controlling the operation of the second actuator. The controller may also control the operation of the second actuator based, at least in part, on the adjusted second position demand to adjust the angular position of the at least one airfoil included within the second array of airfoils.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component from another and are not intended to signify location or importance of the individual components.

In general, the present subject matter is directed to a system and method for controlling the operation of a gas turbine engine so as to synchronize the operation of actuators used to actuate one or more arrays of airfoils of the gas turbine engine. Specifically, in accordance with aspects of the present subject matter, the gas turbine engine may include both a first actuator configured to adjust the angular position of at least one airfoil included within a first array of airfoils of the gas turbine engine and a second actuator configured to adjust the angular position of at least one airfoil included within a second array of airfoils of the gas turbine engine. As will be described in greater detail below, a controller of the gas turbine engine may be configured to control the operation of the first and second actuators so as to synchronize their operation in a manner that maintains a desired positional relationship between separate arrays of airfoils.

For example, in several embodiments, the controller may be configured to monitor an operating parameter of the gas turbine engine. Based on the monitored operation parameter, the controller may then be configured to determine a first position demand for controlling the operation of the first actuator. In addition, the controller may also be configured to determine a second position demand for controlling the operation of the second actuator based, at least in part, on the first position demand determined for the first actuator. For instance, in one embodiment, the controller may set the second position demand to be equal to the first position demand. As a result, the controller may synchronize the operation of the first and second actuators.

In alternative embodiments, the disclosed system and method may allow for the gas turbine engine to have an independent scheduling capability between differing arrays of airfoils. For example, as opposed to simply determining the position demand for the second actuator based on the position demand previously determined for the first actuator, the controller may be configured to apply a bias value associated with controlling the operation of the second actuator. In such an embodiment, the position demand for the second actuator may be determined based on both the position demand for the first actuator and the bias value. As a result, the second array of airfoils may be actuated via the second actuator in a manner that differs from the actuation of the first array of airfoils while maintaining the desired positional relationship between the arrays of airfoils. Furthermore, in order to maintain the desired positional relationship between the arrays of airfoils, the bias value can be continually modified to account for actuator loop tracking differences between the first actuator and the second actuator.

Figure 1:
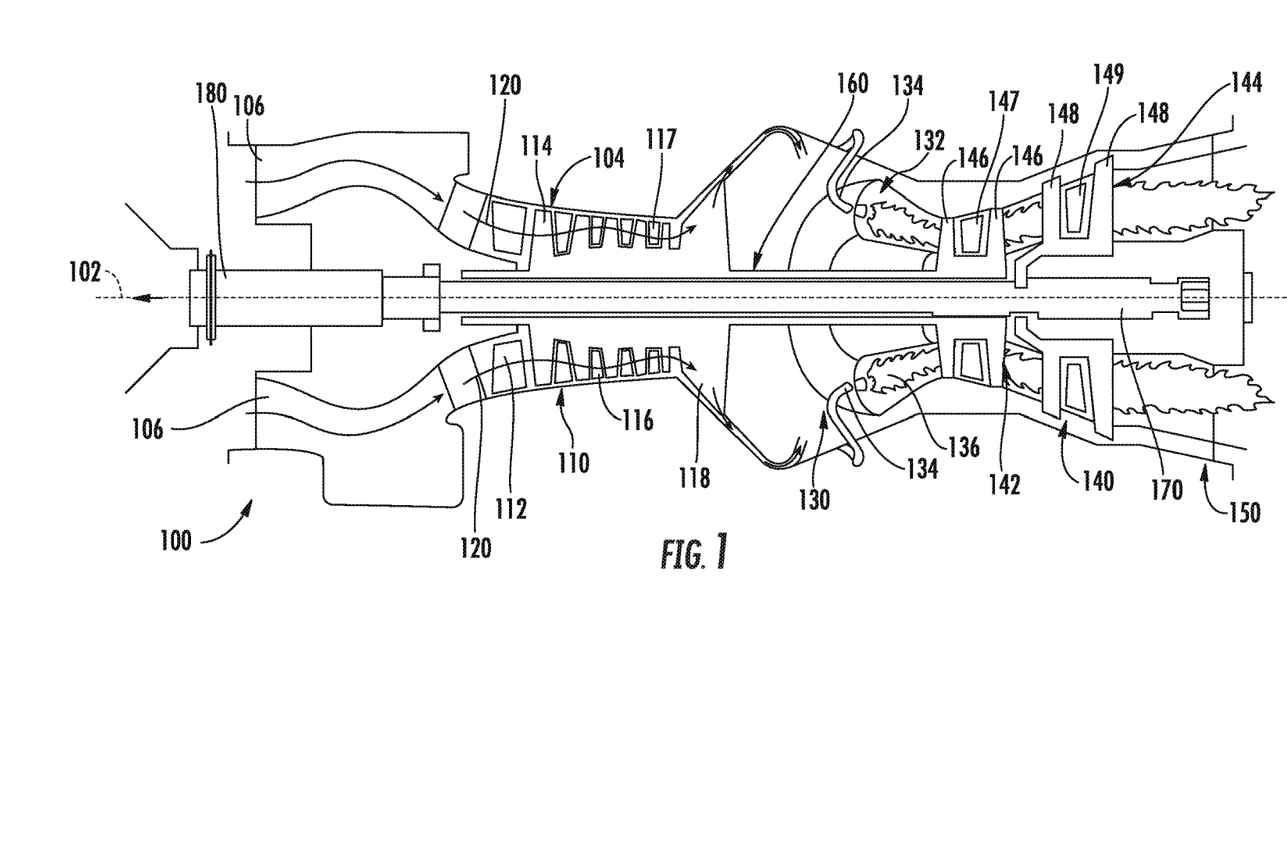
FIG. 1 is a schematic, cross-sectional view of a gas turbine engine in accordance with one embodiment of the present subject matter.

FIG. 1 provides a schematic, cross-sectional view of one embodiment of an exemplary gas turbine engine 100 in accordance with the present disclosure. As shown in FIG. 1, the gas turbine engine 100 defines a longitudinal or centerline axis 102. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential arrays of compressor blades 114, one or more sequential arrays of variable stator vanes 116, one or more sequential arrays of stationary compressor vanes 117, and a centrifugal compressor 118. Collectively, the compressor blades 114, variable stator vanes 116, stationary compressor vanes 117, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine 140 includes a gas generator turbine 142 and a power turbine 144. The gas generator turbine 142 includes one or more sequential arrays of turbine rotor blades 146 and one or more sequential arrays of stator vanes 147. Likewise, the power turbine 144 includes one or more sequential arrays of turbine rotor blades 148 and one or more sequential arrays of stator vanes 149. As will be discussed below in more detail, the gas generator turbine 142 drives the gas generator compressor 110 via a gas generator shaft 160, and the power turbine 144 drives an output shaft 180 via a power turbine shaft 170.

As shown in the embodiment illustrated in FIG. 1, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180.

Figure 2:
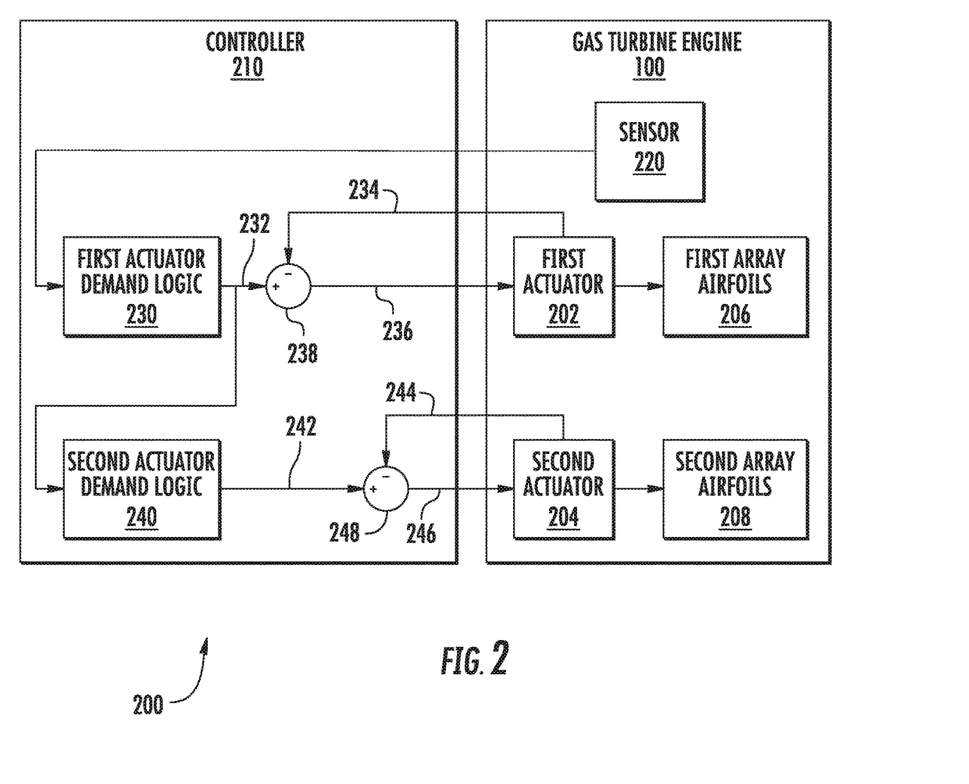
FIG. 2 illustrates a schematic view of a system for controlling the operation of a gas turbine engine in accordance with one embodiment of the present subject matter.

Referring now to FIG. 2, one embodiment of a system 200 for controlling the operation of a gas turbine engine is illustrated in accordance with aspects of the present subject matter. In general, the system 200 will be described with reference to the gas turbine engine 100 described above with reference to FIG. 1. However, in other embodiments, the system 200 may be implemented or used in association with any other suitable gas turbine engine. For example, in one embodiment, the gas turbine engine may be a turbofan engine. Alternatively, in another embodiment, the gas turbine engine may be a turboprop engine.

As shown in FIG. 2, the system 200 may include a first actuator 202 and a second actuator 204. The first actuator 202 may be configured to adjust an angular position of at least one airfoil of a first array of airfoils 206 of the gas turbine engine 100. Similarly, the second actuator 204 may be configured to adjust an angular position of at least one airfoil of a second array of airfoils 208 of the gas turbine engine 100, with the first array of airfoils 206 differing from the second array of airfoils 208. In one exemplary embodiment, the first array of airfoils 206 may correspond to the array of inlet guide vanes 112 of the gas turbine engine 100, and the second array of airfoils 208 may correspond to at least one array of the variable stator vanes 116 of the gas turbine engine 100. Accordingly, in such an embodiment, the first actuator 202 may be configured to adjust the angular position of the inlet guide vanes 112, and the second actuator 204 may be configured to adjust the angular position of at least one array of the variable stator vanes 116. However, in other embodiments, the first and second arrays of airfoils 206, 208 may correspond to any other suitable array of airfoils of the gas turbine engine 100, including successive arrays of airfoils of the gas turbine engine 100 and/or arrays of airfoils that are separated axially by one or more intermediate arrays of airfoils. For example, the first array of airfoils 206 may correspond to one, two, or more arrays of compressor vanes (e.g., variable stator vanes 116 of FIG. 1). In addition, the second array of airfoils 208 may correspond to one, two, or more arrays of compressor vanes.

Figure 3:
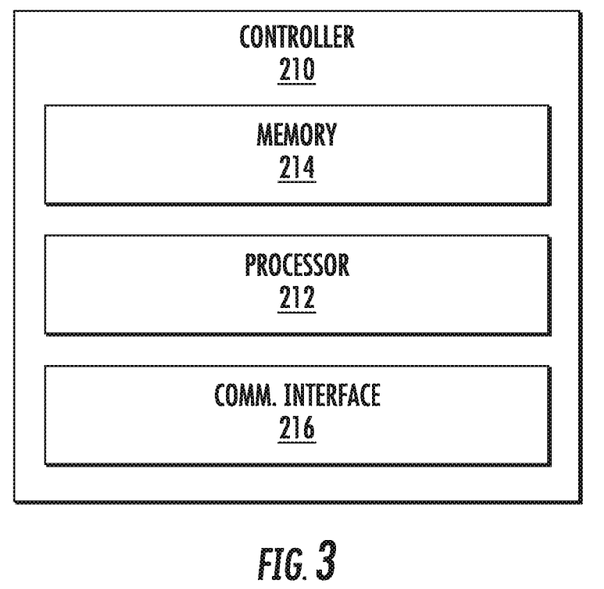
FIG. 3 illustrates a block diagram of one embodiment of an exemplary controller that may be used within the system of FIG. 2.

The system 200 may also include a controller 210. In general, the controller 210 may correspond to any suitable processor-based device, including one or more computing devices. For instance, FIG. 3 illustrates one embodiment of suitable components that may be included within the controller 210. As shown in FIG. 3, the controller 210 may include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Additionally, as shown in FIG. 3, the controller 210 may also include a communications interface module 216. In several embodiments, the communications interface module 216 may include associated electronic circuitry that is used to send and receive data. As such, the communications interface module 216 of the controller 210 may be used to send and receive data to and from the first and second actuators 202, 204. In addition, the communications interface module 216 may also be used to communicate with any other suitable components of the gas turbine engine 100, including any number of sensors configured to monitor one or more operating parameters of the engine 100. It should be appreciated that the communications interface module 216 may be any combination of suitable wired and/or wireless communications interfaces and, thus, may be communicatively coupled to one or more components of the gas turbine engine 100 via a wired and/or wireless connection.

Referring back to FIG. 2, the controller 210 may, in several embodiments, be configured to receive data from one or more sensors (e.g., sensor 220) configured to provide measurement signals associated with one or more operating parameters of the gas turbine engine 100. As such, by receiving the measurement signals from the sensor 220, the controller 210 may be configured to continuously monitor the associated operating parameter(s). In one embodiment, the sensor 220 may correspond to a speed sensor or any other suitable sensing device configured to provide measurement signals associated with the rotational speed $N_G$ of the gas generator shaft 160, thereby allowing the controller 210 to monitor the engine core speed. However, it should be appreciated that, in alternative embodiments, the sensor 220 may be configured to measure any other suitable operating parameter of the gas turbine engine 100.

Additionally, in accordance with aspects of the present subject matter, the controller 210 may be configured to determine a first position demand (e.g., indicated by arrow 232) for controlling the operation of the first actuator 202 based, at least in part, on the operating parameter being monitored via the sensor 220 (e.g., the engine core speed). More specifically, as shown in FIG. 2, the controller 210 may include logic 230 that, when executed, may configure the controller 210 to determine the first position demand 232 based on the monitored operating parameter. For instance, the controller 210 may include a look-up table comprising a plurality of values, and each of the plurality of values may correspond to a distinct value of the monitored operating parameter. More specifically, the controller 210 may select one of the plurality of values that corresponds to the monitored operating parameter.

As shown in FIG. 2, the controller 210 may also be configured to receive feedback data from the first actuator 202 (e.g., from a position sensor (not shown) associated with the first actuator 202) that is indicative of the current or actual position 234 of the first actuator 202 (e.g., as indicated by arrow 234). Based on the actual position 234 of the first actuator 202, the controller 210 may be configured to determine a position error (e.g., as indicated by arrow 236) between the first position demand 232 and the actual position 234 of the first actuator 202. In particular, as shown in FIG. 2, the controller 210 may determine the position error 236 by subtracting the actual position 234 from the first position demand 232 (e.g., via a differential block 238). The controller 210 may then control the operation of the first actuator 202 based on the determined position error 236 to ensure that the first array of airfoils 206 is actuated to a desired angular position.

The controller 210 may also be configured to determine a second position demand (e.g., as indicated by arrow 242) for controlling the operation of the second actuator 204 based, at least in part, on the first position demand 232 determined for the first actuator 202. More specifically, as shown in FIG. 2, the controller 210 may include logic 240 that, when executed, may configure the controller 210 to determine the second position demand 242 based, at least in part, on the first position demand 232. For instance, the controller 210 may include a look-up table comprising a first table of values and a second table of values. Each value in the first table may correspond to the first position demand 232, and each value in the second table may correspond to the second position demand 242. As such, the controller 210 may, when executing the logic 240, select a first value from the first table of values based on the first position demand 232. The controller 210 may then determine the corresponding value for the second position demand 242 from the second table based on the selected first value. Accordingly, in some embodiments, the second position demand 242 for the second actuator 204 may be linked to the first position demand 232 for the first actuator 202. In one exemplary embodiment, the selected value may match the first position demand 232. Put another way, the controller may set the second position demand 242 to be equal to the first position demand 232.

In addition, the controller 210 may be configured to receive feedback data from the second actuator 204 (e.g., from a position sensor (not shown) associated with the second actuator 204) that is indicative of the current or actual position of the second actuator 204 (e.g., as indicated by arrow 244). The controller 210 may then be configured to determine a position error (e.g., as indicated by arrow 246) between the second position demand 242 and the actual position 244 of the second actuator 204. In particular, as shown in FIG. 2, the controller 210 may determine the position error 246 by subtracting the actual position 244 for the second actuator 204 from the second position demand 242 (e.g., via a differential block 248). The controller 210 may then control the operation of the second actuator 204 based on the determined position error 246 to ensure that the second array of airfoils 208 is actuated to a desired angular position.

Figure 4:
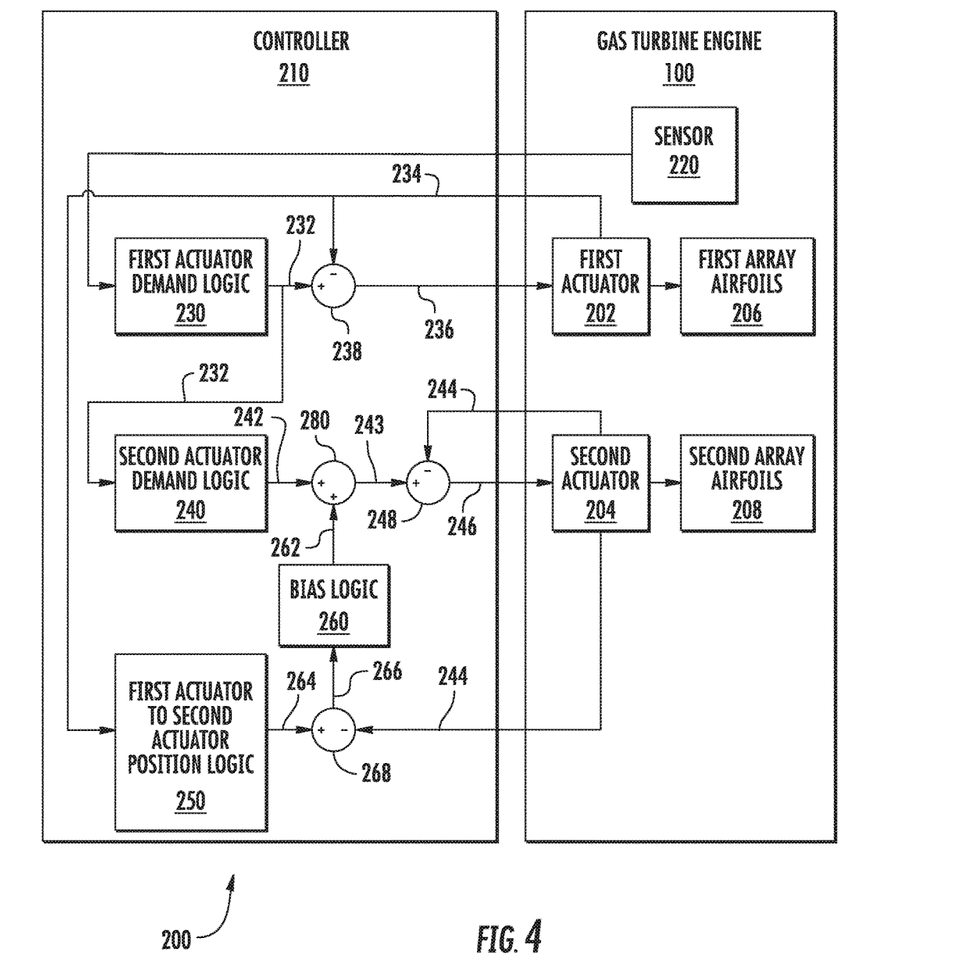
FIG. 4 illustrates the system of FIG. 2 in accordance with another embodiment of the present subject matter.

Referring now to FIG. 4, a schematic block diagram of a modified version of the system 200 shown in FIG. 2 is illustrated in accordance with another embodiment of the present subject matter. In general, the system 200 of FIG. 4 may be configured in substantially the same manner as the system 200 depicted in FIG. 2, and accordingly, the same or similar numbers may refer to the same or similar parts. For example, as shown, the system 200 includes a first actuator 202 configured to actuate a first array of airfoils 206 of the gas turbine engine 100 and a second actuator 204 configured to actuate a second array of airfoils 208 of the gas turbine engine 100.

However, unlike the embodiment described above with reference to FIG. 2, the controller 210 may be configured to adjust the second position demand 242 for the second actuator 204 based, at least in part, on a separate bias value (e.g., as indicated by arrow 262) associated with controlling the operation of the second actuator 204.

As shown in FIG. 4, to determine the bias value 262, the controller 210 may be configured to apply a predetermined position relationship defined for the first and second actuators 202, 204. More specifically, the controller 210 may include logic 250 that, when executed, configures the controller 210 to determine a desired position setting (e.g., as indicated by arrow 264) for the second actuator 204 based on the predetermined position relationship and the actual position 234 of the first actuator 202. As an example, in one embodiment, the logic 250 may include a lookup table comprising a first table of values and a second table of values. Each value in the first table may correspond to an actual position 234 of the first actuator 202, and each value in the second table may correspond to a desired position setting 264 for the second actuator 204. As such, the controller 210 may, when executing the logic 250, select a first value from the first table of values based on the actual position 234 of the first actuator 202. The controller 210 may then determine the corresponding value for the desired position setting 264 from the second table based on the selected first value.

In addition, as shown in FIG. 4, the controller 210 may be configured to determine a position error (e.g., as indicated by arrow 266) between the desired position setting 264 and the actual position 244 of the second actuator 204. In particular, the controller 210 may determine the position error 266 by subtracting the actual position 244 of the second actuator 204 from the desired position setting 264 for the second actuator 204 (e.g., via a differential block 268). As will be discussed below in more detail, the position error 266 may then be used by the controller when implementing suitable bias logic 260 for determining the bias value 262 associated with controlling the operation of the second actuator 204.

Figure 5:
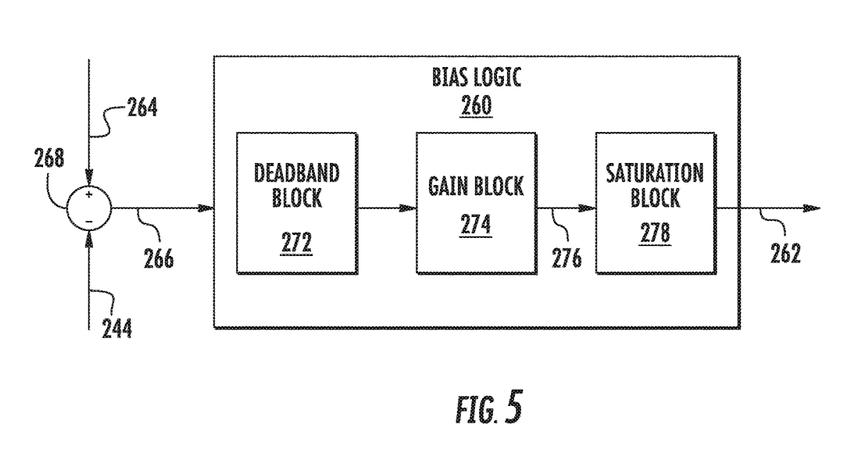
FIG. 5 illustrates a schematic view of one embodiment of exemplary bias logic that may be utilized when implementing the system of FIG. 4.

For example, FIG. 5 illustrates a schematic view of suitable bias logic 260 that may be implemented by the controller 210 to determine the bias value 262 based on the position error 266. In particular, as shown, the bias logic 260 may include a deadband block 272 that ignores the position error 266 if the position error 266 is within a deadband range. Thus, when executing the deadband block 272, the controller 210 may be configured to compare the position error 266 determined based on the desired positional relationship 264 between the first and second actuators 202, 204 to the deadband range. If, upon executing the deadband block 272, the controller 210 determines that the position error 266 falls within the deadband range, the controller 210 may terminate execution of the bias logic 260 and set the bias value 262 to zero.

However, if, upon executing the deadband block 272, the controller 210 determines that the position error 266 does not fall within the deadband range, the controller 210 may continue to execute the bias logic 260. In particular, as shown in FIG. 5, the bias logic 260 includes a gain block 274 that, when executed, configures the controller 210 to apply a gain to modify the position error 266, thereby creating a modified position error (e.g., as indicated by arrow 276). For instance, the controller 210 may include a look-up table with suitable gain values to be applied based on the current position error 266. Further, the bias logic 260 may also include a saturation block 278 that, when executed, configures the controller 210 to limit the modified position error 276 to a value within a range of predetermined bias values. Specifically, the controller 210 may be configured to compare the modified position error 276 to minimum and maximum values for the bias value 262. If the modified position error 276 falls between the minimum and maximum values, the modified position error 276 may be set as the bias value 262. However, if the modified position error 276 is less than the minimum value, the bias value 262 may be set as the minimum value. Similarly, if the modified position error 276 is greater than the maximum value, the bias value 262 may be set as the maximum value.

Referring back to FIG. 4, upon determining the bias value 262, the controller 210 may be configured to determine an adjusted second position demand 243. More specifically, as shown in FIG. 4, the controller 210 may determine the adjusted second position demand 243 based on the sum of the second actuator demand 242 and the bias value 262 (e.g., via summing block 280). Thereafter, the controller 210 may determine the position error 246 between the adjusted second position demand 243 and the actual position 244 of the second actuator 204 (e.g., via the differential block 248). The operation of the second actuator 204 may then be controlled based on the position error 246 to ensure that the second array of airfoils 208 is actuated to a desired angular position.

Figure 6:
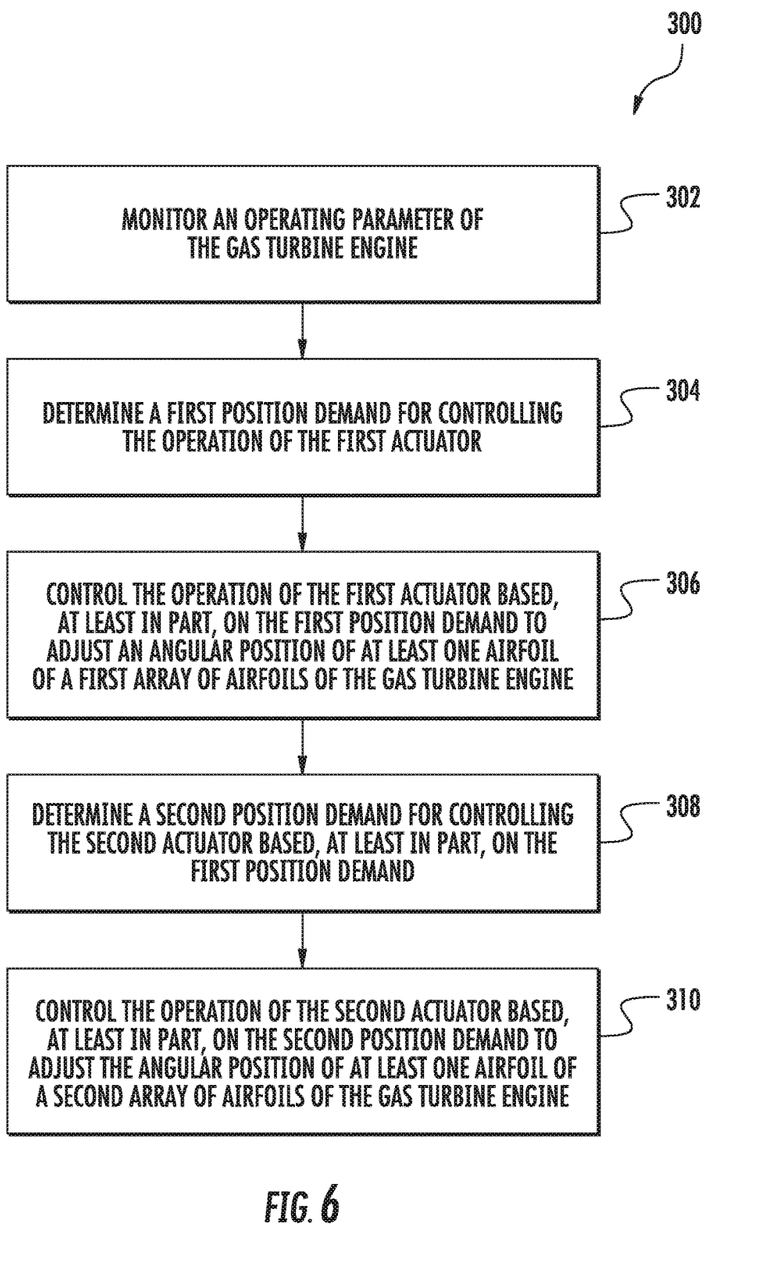
FIG. 6 illustrates a flow diagram of one embodiment of a method for controlling the operation of a gas turbine engine in accordance with aspects of the present subject matter.

Referring now to FIG. 6, a flow diagram of one embodiment of a method 300 for controlling the operation of a gas turbine engine is illustrated in accordance with aspects of the present subject matter. In general, the method 300 will be discussed herein with reference to the system(s) 200 described above with reference to FIGS. 2-4 and the gas turbine engine 100 described above with reference to FIG. 1. However, it should be appreciated by those of ordinary skill in the art that the disclosed method 300 may generally be implemented with gas turbine engines having any suitable engine configuration and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include monitoring an operating parameter of the gas turbine engine. Specifically, as indicated above, the controller 210 may be configured to receive data from one or more sensors 220 associated with one or more monitored operating parameters of the gas turbine engine 100. For example, in one embodiment, the controller may be configured to receive data associated with the rotational speed of the gas generator shaft 160 of the gas turbine engine 100, thereby allowing the controller 210 to monitor the engine core speed.

Additionally, at (304), the method 300 may include determining a first position demand for controlling the operation of the first actuator. For example, as indicated above, the controller 210 may be configured to determine the first position demand based on the monitored operating parameter (e.g., the engine core speed). Moreover, at (306), the method 300 may include controlling the operation of the first actuator based, at least in part, on the first position demand. Specifically, in one embodiment, the controller 210 may control the operation of the first actuator 202 in order to adjust the angular position of at least one airfoil included within a first array of airfoils 206 of the gas turbine engine 100.

Referring still to FIG. 6, at (308), the method 300 may include determining, a second position demand for controlling an operation of the second actuator based, at least in part, on the first position demand associated with controlling the operation of the first actuator. Specifically, in one embodiment, the controller 210 may be configured to simply determine the position demand for the controlling the operation of the second actuator 204 based on the first position demand. In addition, as described above with reference to FIG. 4, the controller 210 may be configured to adjust the second position demand based, at least in part, on a bias value associated with controlling the operation of the second actuator.

Additionally, at (310), the method 300 may include controlling the operation of the second actuator based, at least in part, on the second position demand. Specifically, as indicated above, the controller 210 may control the operation of the second actuator 204 to adjust the angular position of at least one airfoil included within a second array of airfoils 208 of the gas turbine engine 100.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a gas turbine engine comprising a first actuator for adjusting the angular position of at least one airfoil included within a first array of airfoils of the gas turbine engine and a second actuator for adjusting the angular position of at least one airfoil included within a second array of airfoils of the gas turbine engine, the method comprising:
    monitoring, with a controller of the gas turbine engine, an operating parameter of the gas turbine engine;
    determining, with the controller, a first position demand for controlling an operation of the first actuator based, at least in part, on the monitored operating parameter;
    controlling, with the controller, the operation of the first actuator based, at least in part, on the first position demand to adjust the angular position of the at least one airfoil included within the first array of airfoils;
    determining, with the controller, a second position demand for controlling an operation of the second actuator based, at least in part, on the first position demand;
    adjusting, with the controller, the second position demand based, at least in part, on a bias value associated with controlling the operation of the second actuator; and
    controlling, with the controller, the operation of the second actuator based, at least in part, on the adjusted second position demand to adjust the angular position of the at least one airfoil included within the second array of airfoils.

2. The method of claim 1, further comprising determining, with the controller, the bias value associated with controlling the operation of the second actuator based, at least in part, on a predetermined position relationship defined for the first and second actuators.

3. The method of claim 1, further comprising determining, with the controller, a desired position setting for the second actuator based, at least in part, on an actual position of the first actuator and a predetermined position relationship defined for the first and second actuators.

4. The method of claim 3, further comprising determining, with the controller, a position error between the desired position setting for the second actuator and an actual position of the second actuator.

5. The method of claim 4, further comprising determining, with the controller, the bias value associated with controlling the operation of the second actuator based, at least in part, on the position error between the desired position setting for the second actuator and the actual position of the second actuator.

6. The method of claim 5, further comprising limiting, with the controller, the bias value determined based, at least in part, on the position error to a value defined within a predetermined range of bias values.

7. The method of claim 4, further comprising:
comparing, with the controller, the position error to a deadband range; and
applying a gain to modify the position error if the position error falls outside the deadband range.

8. The method of claim 7, further comprising determining, with the controller, the bias value associated with controlling the operation of the second actuator based, at least in part, on the modified position error.

9. The method of claim 1, wherein determining the adjusted second position demand comprises summing the second position demand and the bias value.

10. The method of claim 1, wherein the first and second arrays of airfoils correspond to separate arrays of variable stator vanes of a compressor of the gas turbine engine.

11. A system for controlling the operation of a gas turbine engine, the system comprising:
at least one airfoil included within a first array of airfoils of the gas turbine engine;
at least one airfoil included within a second array of airfoils of the gas turbine engine;
a first actuator configured to adjust an angular position of the at least one airfoil of the first array of airfoils;
a second actuator configured to adjust an angular position of the at least one airfoil of the second array of airfoils;
a controller configured to control an operation of the first and second actuators, the controller including a processor and associated memory, the memory storing instructions that, when implemented by the processor, configure the controller to:
monitor an operating parameter of the gas turbine engine;
determine a first position demand for controlling the operation of the first actuator based, at least in part, on the monitored operating parameter;
control the operation of the first actuator based, at least in part, on the first position demand to adjust the angular position of the at least one airfoil included within the first array of airfoils;
determine a second position demand for controlling the operation of the second actuator based, at least in part, on the first position demand;
adjust the second position demand based, at least in part, on a bias value associated with controlling the operation of the second actuator; and
control the operation of the second actuator based, at least in part, on the adjusted second position demand to adjust the angular position of the at least one airfoil included within the second array of airfoils.

12. The system of claim 11, wherein the controller is configured to determine the second position demand based, at least in part, on a predetermined position relationship defined for the first and second actuators.

13. The system of claim 11, wherein the controller is further configured to determine a desired position setting for the second actuator based, at least in part, on an actual position of the first actuator and a predetermined position relationship defined for the first and second actuators.

14. The system of claim 13, wherein the controller is further configured to determine a position error between the desired position setting for the second actuator and an actual position of the second actuator.

15. The system of claim 14, wherein the controller is configured to determine the bias value associated with controlling the operation of the second actuator based, at least in part, on the position error between the desired position setting for the second actuator and the actual position of the second actuator.

16. The system of claim 15, wherein the controller is further configured to limit the bias value determined based, at least in part, on the position error to a value defined within a predetermined range of bias values.

17. The system of claim 14, wherein the controller is configured to compare the position error to a deadband range, and wherein the controller is configured to apply a gain to modify the position error if the position error falls outside the deadband range.

18. The system of claim 17, wherein the controller is configured to determine the bias value associated with controlling the operation of the second actuator based, at least in part, on the modified position error.

19. The system of claim 11, wherein the first and second arrays of airfoils correspond to separate arrays of variable stator vanes of a compressor of the gas turbine engine.

* * * * *